(12) United States Patent
Nicholls et al.

(10) Patent No.: US 7,058,368 B2
(45) Date of Patent: Jun. 6, 2006

(54) ADAPTIVE FEEDFORWARD NOISE CANCELLATION CIRCUIT

(75) Inventors: Charles T Nicholls, Nepean (CA); Alain Roussel, Gatineau (CA)

(73) Assignee: Nortel Networks Limited, St. Laurent (CA)

(*) Notice: Subject to any disclaimer, the term of this patent is extended or adjusted under 35 U.S.C. 154(b) by 329 days.

(21) Appl. No.: 10/185,118

(22) Filed: Jun. 27, 2002

(65) Prior Publication Data

US 2004/0198295 A1 Oct. 7, 2004

(51) Int. Cl.
*H04B 1/00* (2006.01)
*H04L 25/03* (2006.01)
*H04M 9/00* (2006.01)

(52) U.S. Cl. ............... 455/114.2; 455/63.1; 455/67.13; 455/296; 455/114.1; 375/296; 375/346; 379/392.01; 379/406.01

(58) Field of Classification Search ............. 455/114.1, 455/114.2, 63.1, 67.13, 67.14, 69, 296, 304–312, 455/318; 375/296, 346; 379/392.01, 406.01–406.16, 379/3

See application file for complete search history.

(56) References Cited

U.S. PATENT DOCUMENTS

| | | | |
|---|---|---|---|
| 4,701,935 A * | 10/1987 | Namiki .................... 375/214 |
| 5,077,532 A | 12/1991 | Obermann | |
| 5,148,117 A | 9/1992 | Talwar | |
| 5,313,498 A * | 5/1994 | Sano .................... 375/350 |
| 5,355,103 A | 10/1994 | Kozak | |
| 5,428,831 A | 6/1995 | Monzello et al. | |
| 5,455,537 A | 10/1995 | Larkin et al. | |
| 5,548,838 A | 8/1996 | Talwar | |
| 5,574,978 A | 11/1996 | Talwar et al. | |
| 5,584,065 A | 12/1996 | Monzello | |
| 5,587,998 A * | 12/1996 | Velardo, Jr. et al. ........ 370/289 |
| 5,742,900 A * | 4/1998 | Arnstein et al. ............. 455/296 |
| 5,760,646 A * | 6/1998 | Belcher et al. ............. 330/149 |
| 5,835,848 A * | 11/1998 | Bi et al. ....................... 455/24 |
| 5,963,847 A * | 10/1999 | Ito et al. ....................... 455/17 |
| 6,311,045 B1 * | 10/2001 | Domokos .................... 455/78 |
| 6,385,435 B1 * | 5/2002 | Lee ............................ 455/24 |
| 6,714,775 B1 * | 3/2004 | Miller ....................... 455/296 |
| 6,836,671 B1 * | 12/2004 | Haigh et al. ................ 455/561 |
| 2001/0002207 A1 * | 5/2001 | Miyamoto et al. .......... 375/346 |
| 2002/0141509 A1 * | 10/2002 | Hoffmann ................... 375/297 |
| 2003/0107434 A1 * | 6/2003 | Mitzlaff ..................... 330/149 |

* cited by examiner

*Primary Examiner*—Duc M. Nguyen
(74) *Attorney, Agent, or Firm*—Barnes & Thornburg LLP

(57) ABSTRACT

A method and apparatus for noise cancellation in communications systems. The method is applicable in situations where an interfering signal or noise must be cancelled within a specified bandwidth. A sample of the interfering signal is used to synthesize a cancellation signal which is of equal amplitude but opposite phase to the original interference signal. Introduction of the cancellation signal into the interference signal path results in substantially complete suppression of the interference signal through vector subtraction of the superposed signal fields. Adaptive cancellation is also provided in that the frequency and bandwidth of the cancellation signal can be controlled. The adaptive nature of the cancellation loop also tracks out imbalances between the interference and cancellation signals caused by temperature variation and component tolerances. The adaptive nature of the cancellation system also allows the system to lock onto and track an interfering signal.

23 Claims, 6 Drawing Sheets

ADAPTIVE FEEDFORWARD NOISE CANCELLATION CIRCUIT

FIELD OF THE INVENTION

The present invention relates to a method and apparatus for noise cancellation for communications systems and a system incorporating the same. It is particularly, though not exclusively, directed to noise cancellation for wireless communications systems including both subscriber equipment and operator network equipment.

BACKGROUND OF THE INVENTION

It is known to provide noise suppression systems for communications systems in general and wireless communications systems in particular. Specifically, it is known to provide noise suppression systems for wireless transceivers (whether base stations or consumer handsets) arranged to suppress noise in the receive path arising from noise introduced in the receive band by amplification of the transmitter. In the case in which the transmit path and receive paths share a common antenna, such interference in the receive path may arise from the transmitted signal being reflected from the antenna back into the receive path. Such an arrangement is shown in U.S. Pat. No. 5,574,978 (Talwar et al.).

A problem with many such noise suppression systems is that they do not typically act as stand-alone systems: they require the introduction of a cancellation signal, derived from the transmit path, into the receive path as, for example in the case of Talwar et al. Their introduction into the design of the transceiver arrangement therefore affects both the design of the transmit path circuitry and the receive path circuitry leading to undesirable complexity.

A further problem with known systems is that whilst known noise suppression techniques for wireless communications systems can provide effective cancellation of interference signals (in some cases to better than 50 dB), nevertheless the circuitry required is typically either complex (involving complex digital processing circuitry to provide adaptive cancellation) or costly or both.

A further problem with such systems is that it is difficult to implement these systems without a significant re-design of the power amplifier architecture in order to take the noise cancellation aspects into account. An example of this is where the noise reduction system is integrated around the power amplifier as, for example, in the case of the noise suppression technique disclosed in U.S. Pat. No. 5,455,537 (Larkin et al.). Furthermore the arrangement of Talwar et al. generates the cancellation signal responsive both to the amplified and to the un-amplified input signal. This further adds to the required complexity of the cancellation circuitry.

Conventional noise reduction using cavity comb line filters can be expensive, larger and have relatively high insertion loss.

U.S. Pat. No. 5,148,117 (Talwar) discloses an adaptive feed-forward method and apparatus for amplifier noise reduction. The system obtains a reference signal and sample signal from an amplifier by directional couplers. The sample signal essentially consists of an undistorted input signal component and a noise and distortion component. The reference and sample signals are provided to an adaptive interference canceller which performs an adaptive cancellation process. The interference canceller provides a cancellation signal which is common to both the reference signal and the sample signal. The cancellation signal is injected into a transmission line which carries the sample signal so that only an error signal remains which essentially consists of the noise distortion component of the amplifier output signal. The error signal is then amplitude and phase adjusted to have substantially the same amplitude and substantially 180° out of phase with the amplifier output signal. The amplitude and phase adjustment error signal is then injected by a directional coupler onto the transmission line which carries the amplifier output signal so that an amplified input signal is provided by the power amplifier without the noise and distortion components added by the amplifier.

U.S. Pat. No. 5,355,103 (Kozak) provides a fast-settling, wide dynamic range vector modulator for use in an interference cancellation system or the like, and which Includes a quadrature hybrid which receives an RF signal and divides the signal into a primary in-phase component and a primary quadrature phase component signal.

U.S. Pat. No. 5,077,532 (Obermann et al.) discloses a teed forward distortion minimization circuit which receives an input signal and routes the input signal along two paths. One path, the main signal path, includes a distortion generator such as, for example, a power amplifier, which generates an output signal having a distortion component. The other path, the feed forward signal path, includes a delay line responsive to the input signal for feeding the input signal forward without distortion. The output signal from the distortion generator is combined with a feed forward input signal to form an error signal representative of the distortion component. A feedback circuit is employed to detect a DC current or RF voltage proportional to the error signal's signal strength and to adjust the amplitude and the phase to reduce the carrier to distortion ratio of the error signal. Thereafter, the error signal is subtracted from the main signal to cancel any distortion components therein. The subtraction is controlled by circuitry which detects distortion at the main signal path output, and adjusts the amplitude and the phase of the error signal, so that when the error signal is subtracted from the main signal path, substantially all distortion is cancelled.

In this arrangement, the cancellation circuit is arranged to be coupled around the amplifier which introduces the distortion so as to achieve a comparison between the un-amplified signal and the signal after amplification including distortion and compensation. Furthermore, cancellation is effected across the whole signal band, including those frequencies which the amplifier is intended to amplify.

It is therefore desirable to provide an improved noise cancellation architecture which provides for noise cancellation within a specific and possibly dynamically varying frequency range, which will have lower component cost, be physically more compact, or have a relatively lower insertion loss than known systems.

U.S. Pat. No. 5,548,838 (Talwar et al.), U.S. Pat. No. 5,574,978 (Talwar et al.), U.S. Pat. No. 5,428,831 (Monzelo et al.), and U.S. Pat. No. 5,584,065 (Monzello) also relate to noise cancellation systems.

OBJECTS OF THE INVENTION

The invention seeks to provide an improved method and apparatus for noise cancellation in communications systems generally and, particularly, in wireless communications systems arrangements.

SUMMARY OF THE INVENTION

The invention provides method apparatus, and software for noise cancellation in communications systems and services taking advantage of such noise cancellation. The method is applicable in situations where an interfering signal or noise must be cancelled within a specified bandwidth. A sample of the interfering signal is used to synthesize a cancellation signal. The cancellation signal is of equal amplitude but opposite phase to the original interference signal.

Introduction of the cancellation signal into the interference signal path results in substantially complete suppression of the interference signal through vector subtraction of the superposed signal fields. Adaptive cancellation is also provided in that the frequency and bandwidth of the cancellation signal can be controlled. The adaptive nature of the cancellation loop also tracks out imbalances between the interference and cancellation signals caused by temperature variation and component tolerances. The adaptive nature of the cancellation system also allows the system to lock onto and track an interfering signal.

According to a first aspect of the present invention there is provided a method of performing noise cancellation comprising the steps of: receiving a signal having a frequency band; generating a cancellation signal responsive to the signal for at least one predetermined frequency sub-band of the frequency band; combining the cancellation signal with a time-delayed copy of the signal whereby to provide an output signal having a reduced amplitude region corresponding to the predetermined frequency sub-band.

In a preferred embodiment, the step of generating a cancellation signal is performed for only one predetermined frequency sub-band of the frequency band In a preferred embodiment, the step of generating a cancellation signal is performed for more than one predetermined frequency sub-band of the frequency band.

Advantageously, more than one frequency sub-band is cancelled so as to cancel noise from multiple sources.

The method may also comprise the steps of: receiving a pilot tone; determining the predetermined frequency sub-band responsive to the pilot tone.

In a preferred embodiment, the pilot tone is swept through a pre-determined frequency band whereby to broaden the effective frequency sub-band.

Advantageously, cancellation is achieved over a wider frequency band, though potentially at a reduced cancellation level.

In a preferred embodiment, the predetermined frequency band varies dynamically.

Advantageously, cancellation can be adjusted to correspond to variations in the band in which noise is considered a problem.

In a preferred embodiment, the signal is a transmit signal for a transceiver and the predetermined frequency sub-band corresponds to a receive frequency of the transceiver.

Advantageously, interference in the received signal caused by transmission of the amplified signal at the receive frequency is readily cancelled without introducing noise cancellation signals into the receive path. Furthermore, since the cancellation is conducted in the transmit path, there is no receive path noise figure associated with the noise cancellation system. Also the noise cancellation system can operate in the receive band without adversely affecting the desired receive path signal since the noise is cancelled in the transmit path rather than in the receive path.

In a preferred embodiment, the predetermined frequency sub-band is determined by a local oscillator synchronised with the receive frequency.

In a preferred embodiment, the transceiver is a radio frequency transceiver.

In a preferred embodiment, the transceiver is one of a wireless base station arrangement and a wireless communications terminal device.

Advantageously, the same technique can be applied to noise cancellation both in mobile handsets and in base stations. In a handset, the method would most likely be implemented within a single chip or chipset.

In a preferred embodiment, the frequency band corresponds to an active receive channel frequency.

Advantageously, the frequency band upon which cancellation is performed automatically tracks changes in the receive frequency, whether on account of component characteristics varying according to temperature, etc. or on account of system management initiated changes of receive frequencies, or indeed any other reason.

In a preferred embodiment, the signal is a signal received by a transceiver and the predetermined frequency sub-band corresponds to a frequency of a received interference signal.

In a preferred embodiment, the transceiver is a radio frequency receiver.

In a preferred embodiment, the signal is a transmit signal for a transceiver and the predetermined frequency sub-band corresponds to a receive frequency of the transceiver and in which the predetermined frequency sub-band is determined by a local oscillator synchronised with the receive frequency.

In a preferred embodiment, the signal is provided by amplification of a second signal, and in which the step of generating a cancellation signal is performed without reference to the second signal.

According to a further aspect of the present invention there is provided a method of performing signal cancellation in a system comprising a receive path and, optionally, a transmit path coupled to the receive path, the method comprising the steps of: monitoring the receive path whereby to identify a frequency band at which unwanted noise is present; generating a cancellation signal responsive to receipt of a signal occurring at the frequency band on a signal path being one of the receive path and the transmit path; coupling the cancellation signal into the signal path whereby to mitigate the effects of the unwanted noise.

In a preferred embodiment, the step of generating a cancellation signal is performed for two predetermined frequency sub-bands of the frequency band whereby to define a passband associated with the signal.

The invention also provides for a system for the purposes of communications which comprises one or more instances of apparatus embodying the present invention, together with other additional apparatus, In particular, according to a further aspect of the present invention there is provided a noise cancellation circuit comprising: a first circuit arranged for receiving a signal having a frequency band; a second circuit, coupled to the first, and arranged for generating a cancellation signal responsive to the signal for at least one predetermined frequency sub-band of the frequency band; a third circuit, coupled to the second, and arranged for combining the cancellation signal with a time-delayed copy of the signal whereby to provide an output signal having a reduced amplitude region corresponding to the predetermined frequency sub-band.

In a preferred embodiment, the noise cancellation circuit additionally comprises: a fourth circuit arranged for receiving a pilot tone and coupled to the second circuit whereby to determine the predetermined frequency band responsive to the pilot tone.

According to a further aspect of the present invention there is provided a transceiver comprising a noise cancellation circuit according to claim 19.

Advantageously, the frequency band upon which cancellation is performed may be as narrow as desired. This improves the effectiveness of cancellation within the selected narrow frequency band since cancellation at any specific frequency degrades as the band over which cancellation is performed widens.

Advantageously, an indication of a single frequency may be combined with an indication of a predetermined or dynamically varying frequency band width to determine a particular frequency band for noise cancellation.

Advantageously, noise present in the amplified signal for transmission can be cancelled in response to interference identified by the receiver.

In a preferred embodiment, the step of cancelling comprises the steps of: monitoring the amplified signal; providing a cancellation signal responsive to the amplified signal and the indication of frequency band; combining the cancellation signal with the amplified signal to provide a noise cancelled amplified signal for transmission.

In a preferred embodiment, the step of cancelling is performed independent of the signal provided for transmission.

Advantageously, there is no need to provide monitoring of or cancellation feedback to the un-amplified signal for transmission, or to the amplifier providing the amplified signal. The method, including monitoring of the transmission signal and its modification to effect cancellation, is applied exclusively to the amplified signal for transmission.

Advantageously, this permits simultaneous or successive cancellation of a plurality of frequency bands. Apparatus arranged to perform the simultaneous instances of the method can arranged in parallel and readily added or removed from the arrangement.

The invention is applied in a situation where an interfering signal or noise must be cancelled within a specified bandwidth. The invention uses a sample of the interfering signal to synthesize a cancellation signal. The cancellation signal is of equal amplitude but opposite phase to the original interference signal. Introduction of the cancellation signal into the interference signal path results in suppression of the interference signal through vector subtraction of the superposed signal fields.

The invention also provides adaptive cancellation in that the frequency and bandwidth of the cancellation signal can be controlled. The adaptive nature of the cancellation loop also tracks out imbalances between the interference and cancellation signals caused by temperature variation and component tolerances.

The present invention can also be arranged to track the system local oscillator frequency such that noise cancellation at a particular offset frequency from the local oscillator and of a particular bandwidth can be achieved.

Advantageously, analogue circuitry may be employed which uses relatively few components and is consequently significantly cheaper and smaller than known noise cancellation implementations.

Advantageously, the present invention can be used following any amplifier since the noise reduction process is completely self-contained. There is no need to re-introduce the cancellation signal sampled at the output of the power amplifier into the receive path.

Advantageously, the present invention is designed to be located entirely after the power amplifier and hence allows the noise reduction circuit to be completely decoupled from the power amplifier if required.

Advantageously, the present invention in combination with a simple, relatively cheap filter exhibits lower component cost, is physically more compact, and has a relatively lower insertion loss than known systems involving cavity comb line filters. Advantageously, the invention also provides frequency agility with respect to the center frequency of the cancellation band which is impossible with a filter because of its fixed physical structure which defines its frequency characteristics.

Other aspects of the invention include software on a machine-readable medium for implementing the system or for carrying out (which encompasses controlling) every function of the apparatus and/or methods. This acknowledges that such software can be a valuable, separately tradable commodity. A system in the form of software is intended to encompass software which runs on or controls "dumb" or standard hardware, to carry out the desired functions, (and therefore the software essentially defines the functions of the compensator, and can therefore be termed a compensator, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

In particular, according to a further aspect of the present invention there is provided a program for a computer on a machine readable medium comprising code portions arranged to: control receipt of a signal having a frequency band; control generation of a cancellation signal responsive to the signal for at least one predetermined frequency sub-band of the frequency band; control combination of the cancellation signal with a time-delayed copy of the signal whereby to provide an output signal having a reduced amplitude region corresponding to the predetermined frequency sub-band.

Another aspect provides a method of offering a data transmission service over such a network comprising the present invention. As the advantages of the invention can enable a better network, which is more reliable or more flexible, or greater capacity, or more cost effective for example, consequently a data transmission service over the network can show a corresponding Improvement, and the value of such services can increase. Such increased value over the life of the system, could prove far greater than the sales value of the equipment.

In particular, according to a further aspect of the present invention there is provided a method of providing a data transmission service comprising a data signal, the method comprising the step of: applying the method of the present invention to the data signal.

The preferred features may be combined as appropriate, as would be apparent to a skilled person, and may be combined with any of the aspects of the invention

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

The feed forward cancellation system works on the principle of destructive interference between two signals matched in amplitude and but in anti-phase to each other. The system consists of an RF path from input to output containing a fixed delay, (the delay path) and a cancellation path. The signal applied to the cancellation path consists of a band-limited noise signal sampled from the delay path. The cancellation path circuitry is fine-tuned to appear as an exact replica (ideally), but opposite phase to the noise signal. The cancellation path signal and delay path signal are combined at a point before the output where the two signals will cancel by vector addition. The effectiveness of the system is proportional to the amplitude and phase balance and any mismatch in the delay between the cancellation and delay path signals. The cancellation signal and the delay path signal are combined at the output of the system resulting in cancellation of the interference signal. The system can be used as a stand-alone unit to drop an interference signal power level within a certain bandwidth. The interference signal may be a jamming signal or a noise signal. Specifically the unit finds application in reduction of the receive band noise generated by the power amplifier in cellular base station where additional filtering cannot be used because of the tight constraints on the system insertion loss and the requirement for a frequency agile filtering solution.

The system uses a pilot tone and an adaptive control system to adjust the phase and amplitude of a sampled version of the interfering portion of the input signal in order to achieve the maximum cancellation level. The cancellation loop is based on a phase locked loop approach. Cancellation level is a function of the phase locked loop low frequency loop gain. Component bandwidths, tolerance, noise, distortion, group delays, dynamic ranges and return loss adversely impact the cancellation level. The pilot tone centres the system for maximum cancellation at the pilot tone frequency. A sampled error signal is correlated with the original pilot tone in an I/Q demodulator to drive the adaptive system controlling an I/Q vector modulator towards maximum cancellation.

By using a pilot tone to tune the system, it is possible to tune the system to a different center frequency, allowing a narrowband system (5 MHz) to emulate a wideband system (25 MHz).

By sweeping the pilot tone in a narrow band, the average signal power over this band will be reduced as a function of sweep bandwidth and sweep rate, The invention may be applied on the typical receive band noise signal level present at the output of a transmit power amplifier (e.g. in CDMA, UMTS, GSM, etc. systems). The system may also be exposed to the high power transmit signal (+46 dBm, 40 Watts). SAW technology based notch filters may be used to protect the cancellation circuitry from the transmit power.

Figure 1:
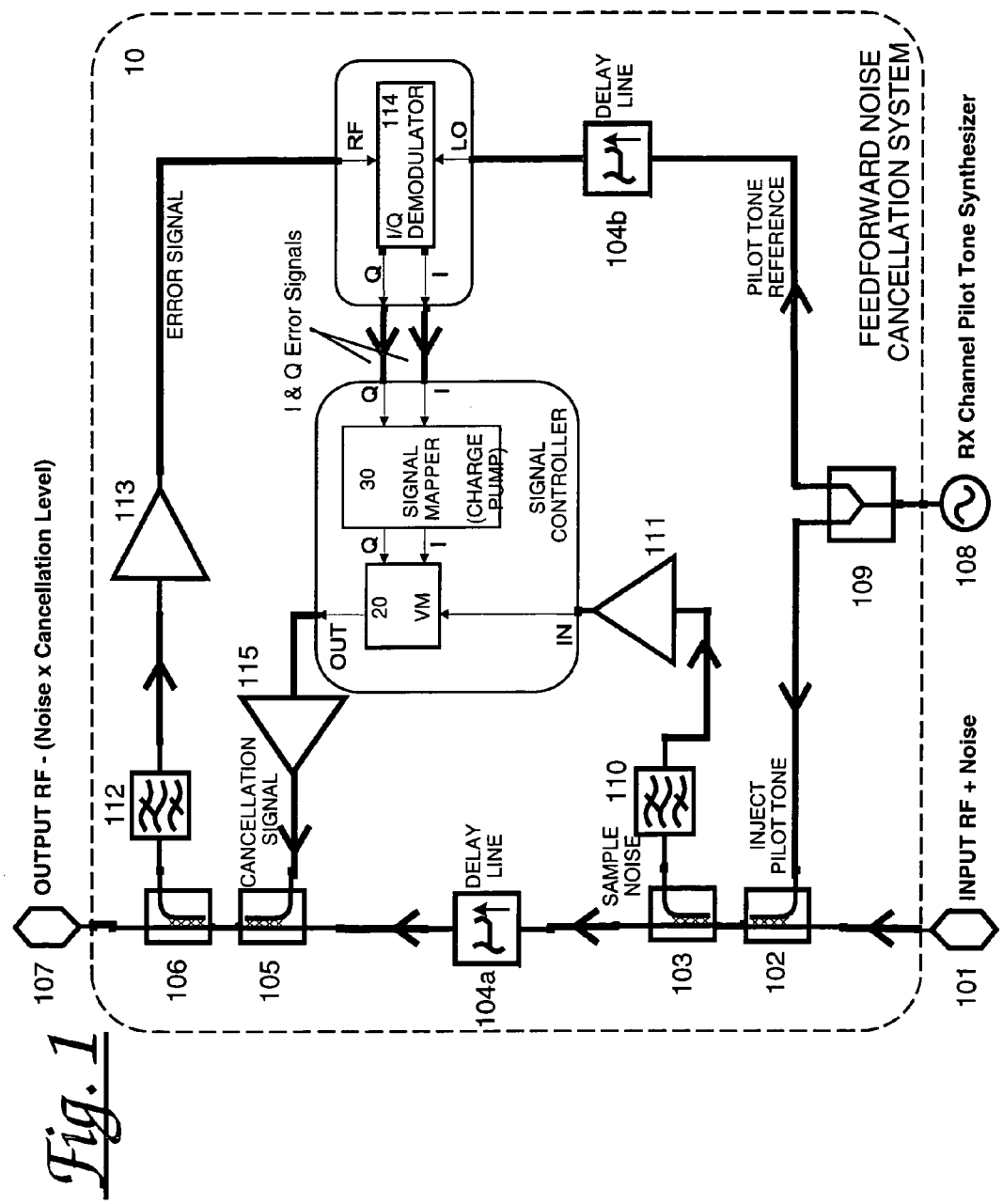
FIG. 1 shows a schematic circuit diagram of a feed forward noise cancellation architecture in accordance with the present invention.
Figure 2:
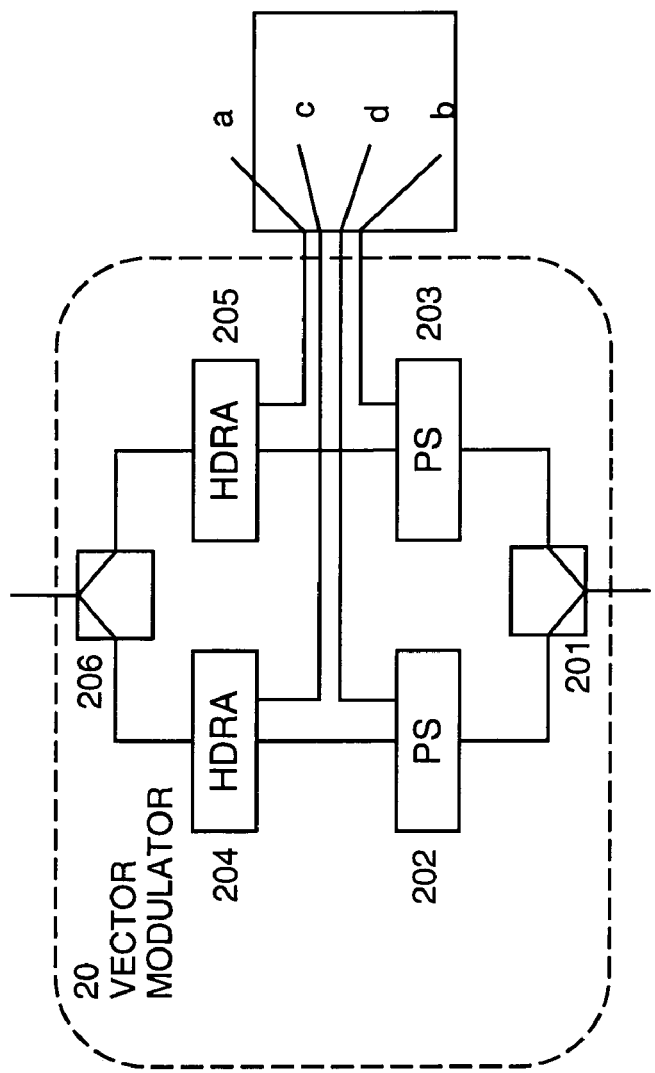
FIG. 2 shows a schematic circuit diagram of a vector modulator suitable for use in the architecture of FIG. 1.
Figure 3:
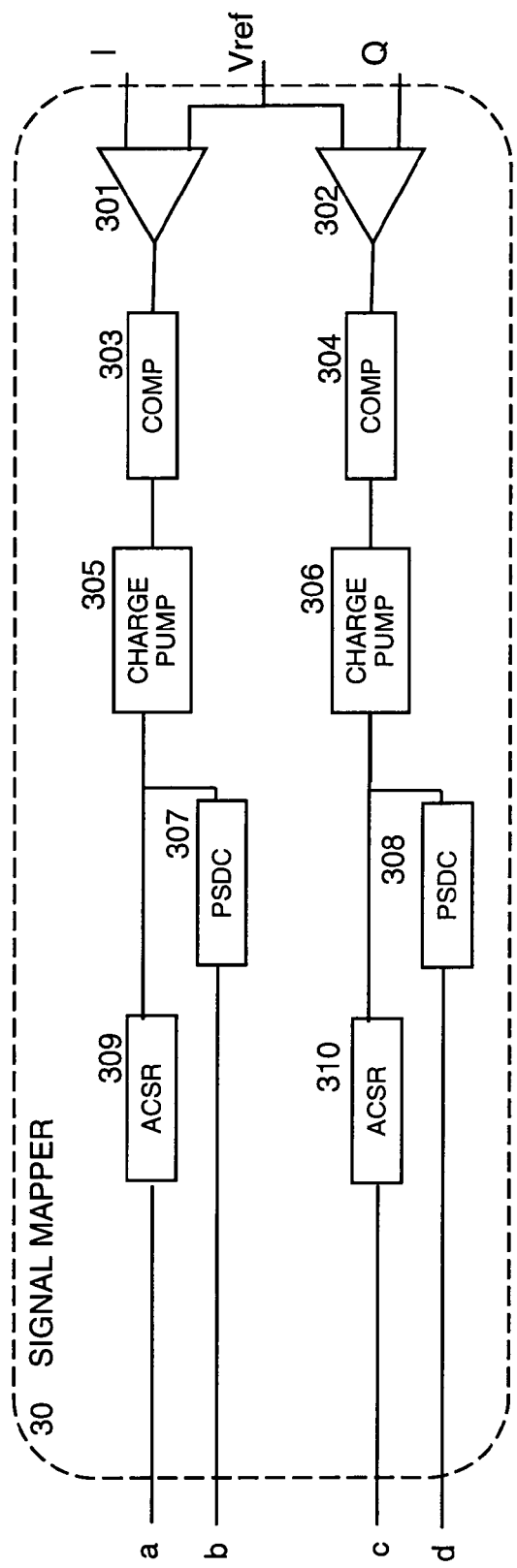
FIG. 3 shows a schematic circuit diagram of a signal mapper suitable for use in the architecture of FIG. 1.

Referring to FIGS. 1–3, a detailed description of an in-line noise cancellation circuit is presented below, addressing the various functional blocks in turn.

Pilot Tone Input

Phase locking of the pilot tone enables digital control of the pilot tone. The pilot tone in a base-station application is slaved to the base station local oscillator synthesizer digital control line and consequently is phase locked to the base-station receive reference oscillator. Slaving the pilot tone to the base-station local oscillator in this manner enables the noise cancellation system centre frequency to track the receive frequency even in the event of the base-station switching to a new receive channel. In addition the pilot tone synthesizer can be locked to a received interference signal in order that the cancellation notch can track the interferer. The interference tracking and cancellation application may also find application in the receive path of the radio system.

The pilot tone is injected into the system at the RF port 108. The tone is then split by means of an in-phase 2-way power divider 109. In one branch the pilot tone is delayed 104b, this pilot tone is input into the LO port of an I/Q demodulator 114. The delay element 104b ensures that the error signal and the pilot tone arrive at the same time at the input ports of the I/Q demodulator. Delay 104b becomes important when the pilot tone is swept to broaden the cancellation bandwidth.

The other branch leads to the directional coupler 102, which injects the pilot tone signal into the system's main RF path. The isolated port of the coupler is terminated in a matched load (not shown). After the pilot tone power is split and then injected into the system, the pilot tone signal in the main RF path is reduced by the coupling level of the couplers 102 and 109.

Noise Signal Sampling

The noise portion of the input RF signal must be sampled from the main RF path while introducing minimal loss. A directional coupler 103 is used for sampling the signal to be cancelled present in the main RF signal path. A matched load (not shown) terminates the isolated port of coupler 103.

Sampled Noise Signal Amplification

The notch filter 110 is centered at the transmit frequency and acts to suppress the transmit power such that the amplifier 111 is not saturated.

The sampled signal is amplified 111 by the coupling factor of the input sampling coupler. In a preferred embodiment, a second amplifier 115 is also provided on the output side of the vector modulator 20 so as to distribute the gain through the system. The second amplifier compensates for the cancellation signal injection coupler. Furthermore, other losses to be overcome are the minimum insertion loss of the vector modulator 20, insertion loss of power divider, insertion loss of recombination 90° hybrid coupler, minimum insertion loss of the phase shifter, and the minimum insertion loss of the absorptive attenuators (only one path is considered for the two latter components, i.e. one hybrid and two absorptive attenuators). In a preferred embodiment, the amplification may be performed in two stages before the vector modulator and one stage after the vector modulator, just before the cancellation signal injection coupler 105. Such a configuration may be chosen to avoid overdriving the attenuator such that any signal distortion is kept to a minimum.

The first two stages of amplifications before the vector modulator 20 and the stage just before cancellation signal injection are designed as follows.

I/Q Vector Modulator: Input Power Divider

Referring specifically to FIG. 2, the amplified sampled noise signal is split in phase and into two equal branches 201, each branch having a pair of cascaded attenuators 204–205 and a 180° phase shifter 202–203. The dynamic range of the attenuators sets the degree of achievable cancellation.

I/Q Vector Phase Shifters

Each of the I/Q branches has to be modified in phase separately. In order to provide a scaling factor for the RF signal in each branch—which can be varied from −1 to +1—the branch signal has to be able to go through a phase inversion of 180° with minimal phase imbalance to provide the required scaling factor polarity. The phase inversion is accomplished using a 90° hybrid coupler and PIN diodes to produce a reflective type PIN attenuator. The PIN diodes act as voltage variable resistors at the RF frequency band used. This varies the impedance on the 0° and 90° ports of the hybrid from a low value (10Ω) to a high value (1000+Ω).

This change in impedance varies the reflection coefficient between the IN port and the ISO port from 1 to −1, creating an effective phase shift of 0° or 180°. Hence the only function of this attenuator is to let the signal pass through with no phase change or to invert its phase by 180°. The phase states are set by the control signal fed from the signal mapper 30, specifically the output of 307 and 308. The adaptive nature of the cancellation circuit automatically compensates for inaccuracies in the phase states.

I/Q Vector Modulator: High Dynamic Range Attenuators

In order to provide good cancellation performance, the I/Q attenuators 204–205 are very high dynamic range attenuators (HDRA) (for example at least 40 dB to achieve 30 dB cancellation). This dynamic range requirement can be achieved, for example, by cascading two voltage variable absorptive attenuators. Such attenuators become reflective at the high attenuation end of their dynamic range. Consequently two attenuators are used to provide good attenuation range whilst maintaining acceptable return loss of less than −15 dB.

I/Q Vector Modulator: 3 dB 90° Hybrid Power Combiner

The vector modulator has two branches, which are combined in quadrature to produce the cancellation signal. A 90° hybrid coupler 206 performs this function.

Cancellation Signal Injection

Referring again to FIG. 1, once the cancellation has been adjusted in phase and amplitude, it is injected back in the system via the directional coupler 105. At the point of cancellation, the cancellation signal is adjusted in phase and amplitude such that it closely matches the amplitude of the signal to be cancelled and is in antiphase. The phase and amplitude balance, as well as delay between the two signals at the point of cancellation, determines the level of cancellation achieved.

Error Signal Sampling

An error signal results from the imperfections in the cancellation process. The error signal is sampled by a directional coupler 106. The sampled error signal is applied to an I/Q demodulator 114. The I/Q demodulator decomposes the sampled error signal into baseband I and Q components. The baseband I/Q demodulator output is arranged to drive the adaptive cancellation system to minimize the sampled error signal. The quadrature demodulator may have internal amplification to increase the loop gain in which case no pre-amplification 113 would be necessary in the RF path leading from the error sampling coupler to the I/Q demodulator.

Main Path Delay Line

Delay in the cancellation path must be matched in the main signal path. This may, for example, be accomplished using a microstrip transmission line 104a of a specific length to introduce the proper delay balance between the through path and the cancellation path.

I/Q Demodulator

The I/Q demodulator 114 is used to decompose the error signal into an I component and a Q component with reference to the pilot tone. I/Q baseband components serve as input to the adaptive control system. The baseband adaptive control system uses the baseband components to drive the vector modulator until the cancellation level reaches the system limit.

The outputs of the I/Q vector demodulator are taken differentially with reference to the reference voltage level Vref.

Baseband Amplifiers

Referring to FIG. 3, the baseband outputs of the I/Q demodulator are amplified 301–302 to provide loop gain necessary to meet the cancellation requirement. Amplifiers having, for example, a −3 dB bandwidth of 20 MHz are adequate for tracking the noise signal. The input to the base-band amplifiers is a differential signal between the demodulator Vref output and the I or Q baseband output Limiter/Comparators The baseband signals are compared and converted into an amplitude limited bipolar signal by means of comparators 303–304. The output signals of the comparators are used to alternately switch the current sink and current source of respective charge pumps 305–306.

BJT Charge Pumps and Loop Filter

The charge pumps 305–306 are used to integrate the error signal and act as a loop filter. Each charge pump comprises two current sources, one to sink and the other to source current from the capacitors in the loop filter.

The charge pumps drive passive third order loop filters which set the static cancellation bandwidth of the system. The dynamic cancellation bandwidth is set by the modulation bandwidth applied to the pilot tone signal source. The cancellation level is determined by the low frequency gain of the phase locked loop formed by the system and the system noise floor.

Phase Shift Decision Comparators (PSDC)

Depending on the charge pump polarity, phase shift decision comparators (PSDC) 307–308 switch the phase shift attenuator to either 0° or 180° phase shift condition. The comparator output consists of only two states which drive the PIN diode 0 and 180 degree phase switches directly.

Attenuation Control Signal Rectification (ACSR) The absorptive attenuators require a unipolar control signal. The control signal is a rectification of the charge pump output Rectification of the charge pump signal is achieved using 4 quadrant multipliers (ACSR) 309–310, in this instance.

Figure 4:
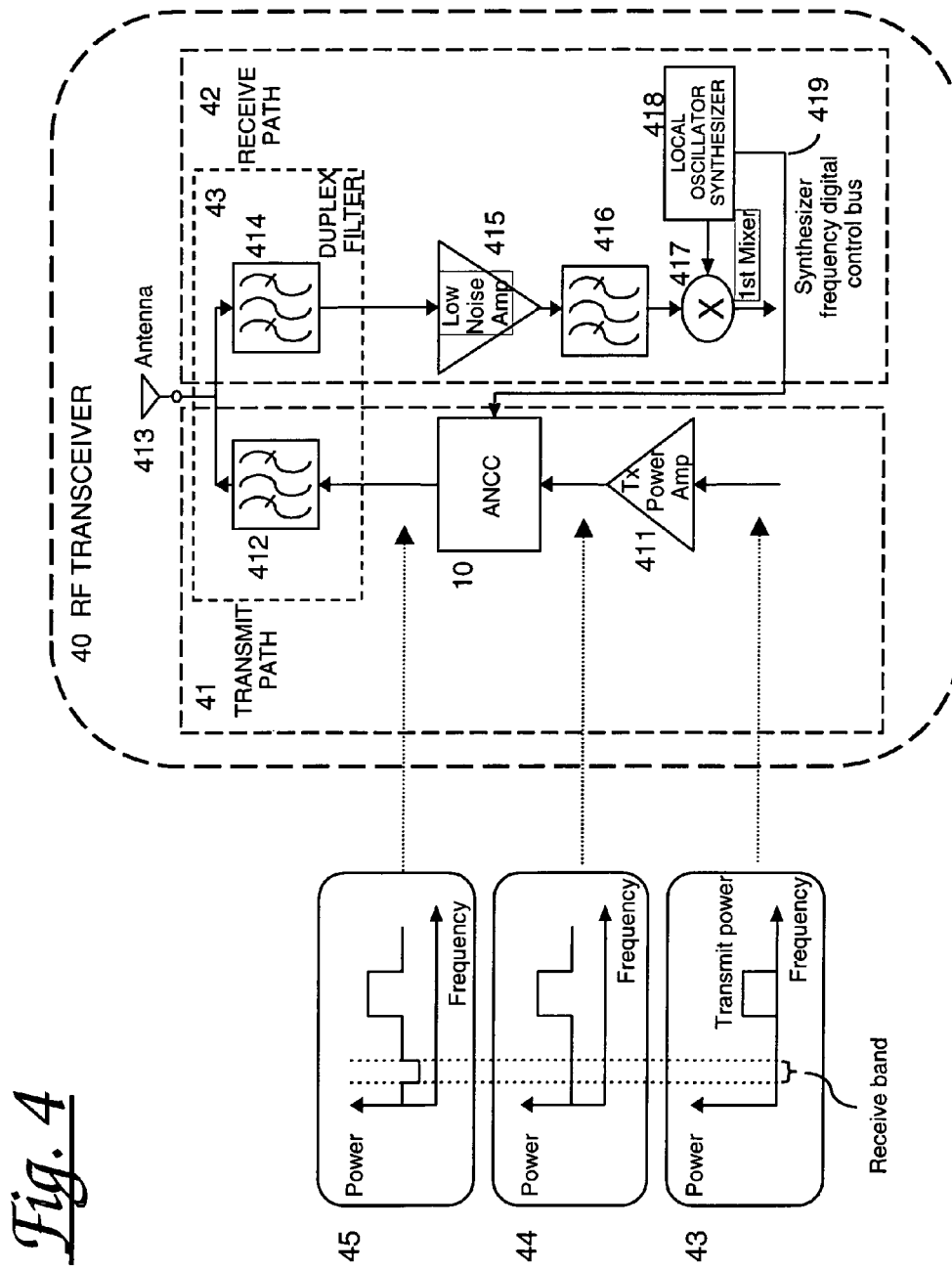
FIG. 4 shows a schematic diagram of a first radio frequency transceiver system employing adaptive noise cancellation in accordance with the present invention.

Referring now to FIG. 4, the feed forward noise cancellation circuit 10 may be applied specifically, for example, to provide adaptive noise cancellation in a radio frequency (RF) transceiver arrangement 40 in which undesirable levels of noise are introduced into the transmission path 41 by, for example, the main transmission amplifier 411.

The RF transceiver comprises a transmission path 41 and a receive path 42 each coupled to a common antenna arrangement 413. The transmit path receives a signal for transmission as an input, amplifies it 411 for transmission, and feeds the amplified signal to the antenna via a band-pass filter 412. In the receive path, signals received from the antenna are filtered using a band-pass filter 414 and passed through a low noise amplifier 415, re-filtered 416 and fed to a mixer 417 having a local oscillator synthesiser 418 as further input so as to provide an intermediate frequency output from the mixer. The two filtering functions 412, 414 may be implemented in practice by a single duplex filter 43.

In practice, noise signals in the transmission signal which occur within the receive band are reflected from the antenna arrangement 413 back onto the receive path 42, causing undesirable distortion of received signals. To compensate for these unwanted signals, the adaptive noise cancellation circuit described above is introduced in the transmit path between the power amplifier 411 and the antenna 413. The cancellation circuit is arranged to provide specific cancellation at the unwanted frequency band or bands.

FIG. 4 also shows schematic graphs of the power versus frequency function of the transmit signal at three points on the transmit path 41: prior to amplification 43; immediately following amplification 44 showing an increased level of noise at frequencies other than the transmit frequency, and including in particular frequencies in the receive band; and following cancellation 45 showing the reduction in noise in the transmit signal effected by the cancellation circuit 10.

The required cancellation is achieved by generation of a cancellation signal derived from the amplified transmit signal and an indication of a receive frequency band corresponding to the receive frequency at which distortion occurs. The cancellation signal is then combined with the amplified signal to form a region of considerably reduced power—a "notch"—at the selected frequency band.

It may be noted that, in this arrangement, the entire cancellation circuit is capable of being inserted at a single point in the transmit path following the amplifier (which is the source of the noise in this particular embodiment). No reference is made to the un-amplified transmission signal, nor is any feedback provided from the cancellation circuit back to or before the amplifier 411. This is possible since complete cancellation of the unwanted noise signal is sought within the specified frequency band: it is therefore not necessary to provide a feed to the cancellation circuit from the un-amplified signal so as to identify any data-carrying signal which should remain within the cancellation frequency band; nor is it necessary to provide any feedback from the cancellation circuit to before the amplifier since, whatever the signal output by the amplifier at that frequency band, as complete as possible cancellation will be performed by the cancellation circuit. In this particular arrangement, the indication of the frequency band at which cancellation is to be performed is provided as a feed 419 from the receive path 42, and indicative of a frequency at which undesired noise is detected. In the embodiment shown, the feed is provided from a local oscillator 418 used to synchronize with a receive channel. In this way noise cancellation on the transmit path 41 is focused on precisely that frequency band where it is most needed, namely that on which an incoming signal is being received. A further advantage of this arrangement is that, as the receive frequency wanders over time (for example as a result of environmental changes in temperature, etc.) or jumps between distinct receive channel frequencies, the noise cancellation notch in the transmitted signal automatically adjusts to track those changes thereby continuing to provide cancellation where it is most needed. Feed 418 is the local oscillator synthesizer frequency control word which is fed to the pilot tone oscillator synthesizer and sets the pilot tone frequency.

Conventionally the receive band noise is reduced through the application of the duplex filter 43. The cancellation circuit described above therefore reduces the specifications placed on the duplex filter 43 with respect to its stop band attenuation. Reduction of the stop band attenuation requirement in the duplex filter reduces the number of filter poles required. Reducing the number of filter poles reduces the cost of the duplex filter since each additional pole adds a significant cost to the overall circuit. In addition each pole removed lowers the insertion loss of the filter which thereby reduces the power output requirement placed on the transmit power amplifier.

Since the noise cancellation circuit is arranged for single-point, in-line insertion in the path on which cancellation is to be performed, the circuit can also be implemented as a self-contained, stand-alone unit which can provide noise or interference signal reduction at the output of any system.

Figure 5:
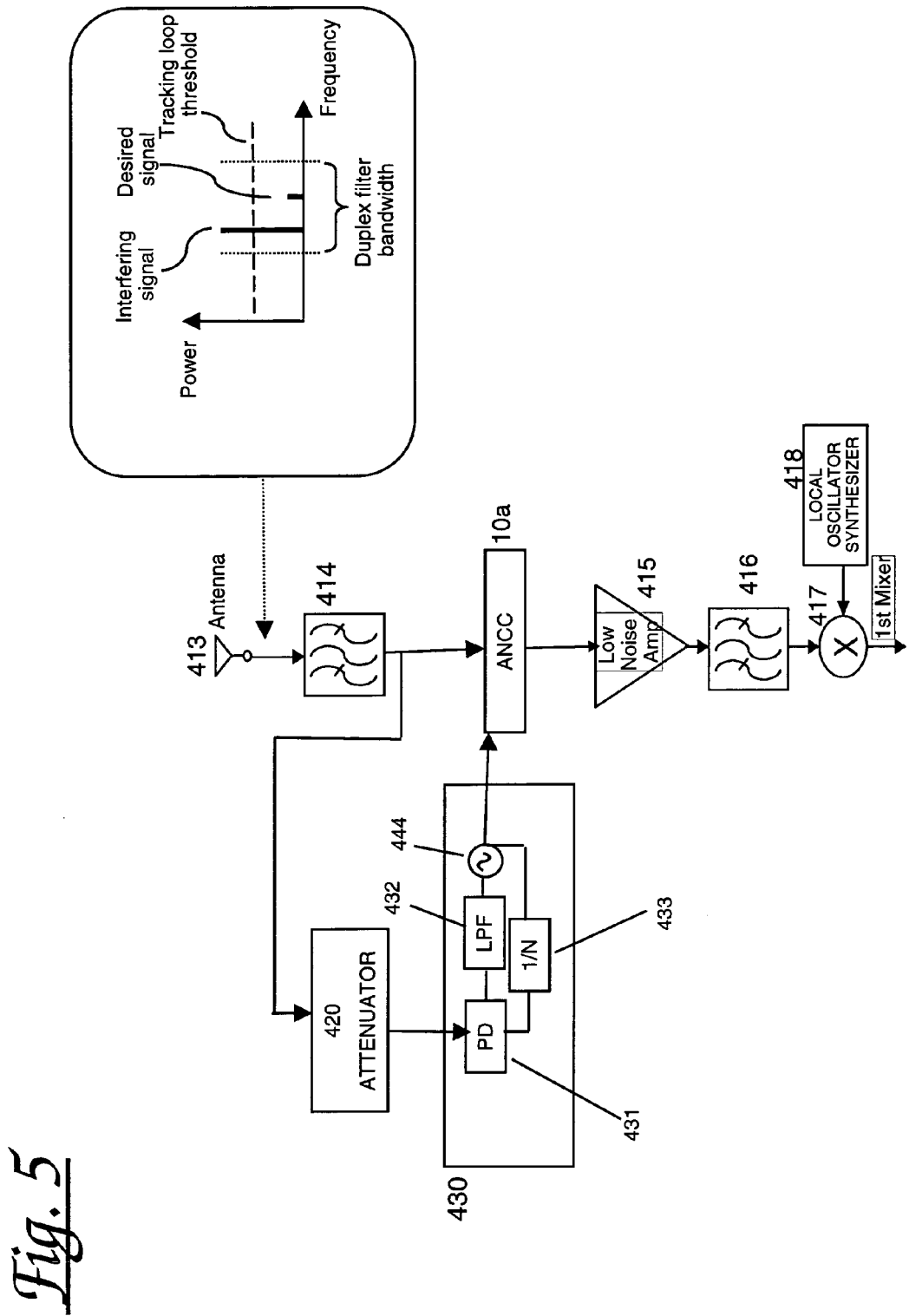
FIG. 5 shows a schematic diagram of a second radio frequency transceiver system employing adaptive noise cancellation in accordance with the present invention.

For example, and referring now to FIG. 5, such noise cancellation circuit can also be inserted on the receive path of an RF transceiver, in order to perform cancellation at a frequency at which a troublesome interferer is detected. Once again the noise cancellation response can be dynamic to adjust according to changes in the receive frequencies in use and the frequency band of identifiable interferers.

In the example shown, an output is fed from the receive filter 414 in the receive path, via an attenuator 420 to a tracking loop 430 arranged to provide the pilot tone input to the ANCC 10a located between the receive path filter 414 and the low noise amplifier 415.

The attenuator sets the threshold level that an interference signal must achieve prior to pilot tone phase lock loop (PLL) locking. The attenuator at the reference port of the pilot tone synthesizer acts as a simple means to ensure only strong interference signals are tracked.

The tracking loop 430 enables the pilot tone to lock to the strong interference signal and steer the cancellation notch to it. In the example illustrated the tracking loop comprises a phase detector 431, a low pass filter 432, a 1/N frequency divider 433 (N=1 because the pilot tone will equal the interference signal frequency) and pilot tone oscillator 444.

In the absence of any inference, the pilot tone will revert to its park frequency which should be outside the receive band. In the event the interferer does not occur at the receive frequency, it must still be notched out in order to avoid saturation of the front end low noise amplifier 415.

By feeding the interferer in as the reference signal to the pilot tone synthesizer the pilot tone can be made to track the Interference signal and hence drive the cancellation loop to centre the cancellation notch at the interference frequency In further embodiments, two or more such cancellation circuits may be provided applied to a single signal path. The signal cancellation circuits may be arranged to provide two distinct cancellation bands which, in combination, define a pass band between the two cancellation frequency bands. The steerable nature of the cancellation circuit enables the pass band to be dynamically moved, thereby providing for a tuneable bandpass filter action. This finds application, for example, in a multimode RF basestation environment in which the basestation must be able to be programmed to receive different bands over time.

Since the noise cancellation circuit 10 is easily inserted at a single point in the transmit path, multiple cancellation circuits may be inserted effectively and efficiently at the same point either in series or, preferably, in parallel so as to provide cancellation at multiple receive frequencies. Where multiple circuits are inserted in series, each will add a delay 104 and its own separate insertion losses in the transmit path; where the circuits are arranged in parallel, only a single delay is required in the transmit path and insertion losses are effectively no worse than those associated with insertion of a single cancellation circuit.

The cancellation system is centered using a pilot tone. Centring here refers to aligning the interference processing system such that maximum cancellation occurs at the frequency of the pilot tone.

The pilot tone and interference signal are coupled into the processing circuit. The processing circuit contains an amplifier to compensate for the loss introduced by the sampling coupler and the cancellation signal re-introduction coupler. The core of the processing circuit consists of an I/Q vector modulator.

The interference and pilot tone signals are split into two equal power signals in the I/Q modulator. The two signal paths are phase shifted by 90 degrees with respect to each other. The I and the Q signals then pass through separate phase shift networks. The phase shift networks are electronically controlled and provide a discrete 0 or 180 degree phase shift of the applied signal depending on the control voltage level. The I and Q signal then pass through separate absorptive attenuators. The absorptive attenuators are electronically controlled in a continuous manner over their dynamic range. The combined result of this phase shift and attenuation allow the RF signal in the I and Q path to be adjusted in amplitude and phase The I and Q signals are then recombined and re-introduced through a second coupler into the main signal path from which the initial signal was extracted. The I/Q vector modulator is designed to introduce a phase shift and amplitude adjustment of the signal passing through it through adjustment of the I and Q signal amplitudes. Allowing a continuous 360° vector modulation of the cancellation signal.

The analogue signal processing performed by the I/Q vector modulator takes a finite length of time, hence the output cancellation signal from the I/Q vector modulator is both delayed and phase shifted. To compensate for the delay a fixed delay line is placed between the sampler coupler and the cancellation signal introduction coupler. The delay is low loss so as not to effect the main signal. In addition the delay is internal to the noise cancellation circuit making the design self-contained.

The adaptive aspect of the noise cancellation system will now be described.

After application of the cancellation signal to the interference/noise signal and pilot tone signal a residual error signal will remain. The error signal from the pilot tone cancellation is sampled via an error coupler which follows the cancellation signal reintroduction coupler. The error signal is applied via an amplifier to an I/Q demodulator. The error amplifier gain largely determines the degree of cancellation achieved. The I/Q demodulator in the error path uses two mixers to which the pilot tone signal generator output is applied in quadrature. Since the pilot tone is acting both as the local oscillator signal to the I/Q demodulator and as the input RF signal to the demodulator the IF output contains a DC component proportional to the error in the I and the error in the Q signals of the vector modulator generating the cancellation signal.

The baseband I and Q components extracted by the demodulator from the error signal are low-pass filtered to remove the higher frequency mixing components.

The resultant baseband signal levels are then applied to a voltage to current converter to generate error currents for driving the phase shifter. The baseband signal is also used to generate the control signal for the attenuators in the vector modulator. The phase and amplitude modulating elements in each branch are biased such that the applied error current acts to reduce the error signal between the cancellation signal and the interference signal.

This operation is similar to the approach used in a PLL for achieving noise suppression of the locked oscillator.

The centre frequency of the cancellation circuit is defined as the frequency corresponding to the maximum level of noise cancellation In turn the maximum cancellation is achieved at the pilot tone frequency which is used to align the cancellation circuit. It is part of the capability of this invention that the pilot tone can be locked to the base station local oscillator through the use of a PLL and in this manner be made to track the base station local oscillator either at the same frequency or at some predefined offset frequency. In this manner the noise cancellation frequency can maintain its offset from the base station local oscillator frequency in the event that the base station local oscillator frequency is changed.

The bandwidth of the cancellation circuit is defined as the frequency range over which the interference signal or noise is cancelled to a predefined level. The invention allows for bandwidth adjustment through provision to frequency modulate the pilot tone. The bandwidth of the frequency modulation will determine the bandwidth of the cancellation circuit By sweeping the pilot tone over say 60 MHz the noise cancellation effect will sweep this band centered at the pilot tone centre frequency. An average cancellation will occur over the entire band. The degree of the cancellation will be less than if the pilot tone is located at a single frequency but greater than in the case where the cancellation circuit is not applied, Note that as the circuit is centered using the pilot tone the pilot tone is effectively removed from the circuit output and will not appear as an additional interference signal.

The present invention therefore provides a low cost noise cancellation implementation using a reduced number of components relative to known systems. The cost is therefore expected to be significantly lower than in known systems.

Implementation of the noise cancellation circuit is also targeted at reducing the insertion loss of the duplex filter by reducing the number of poles required in the filter design. Reduction in filter insertion loss will directly reduce power amplifier cost.

Figure 6:
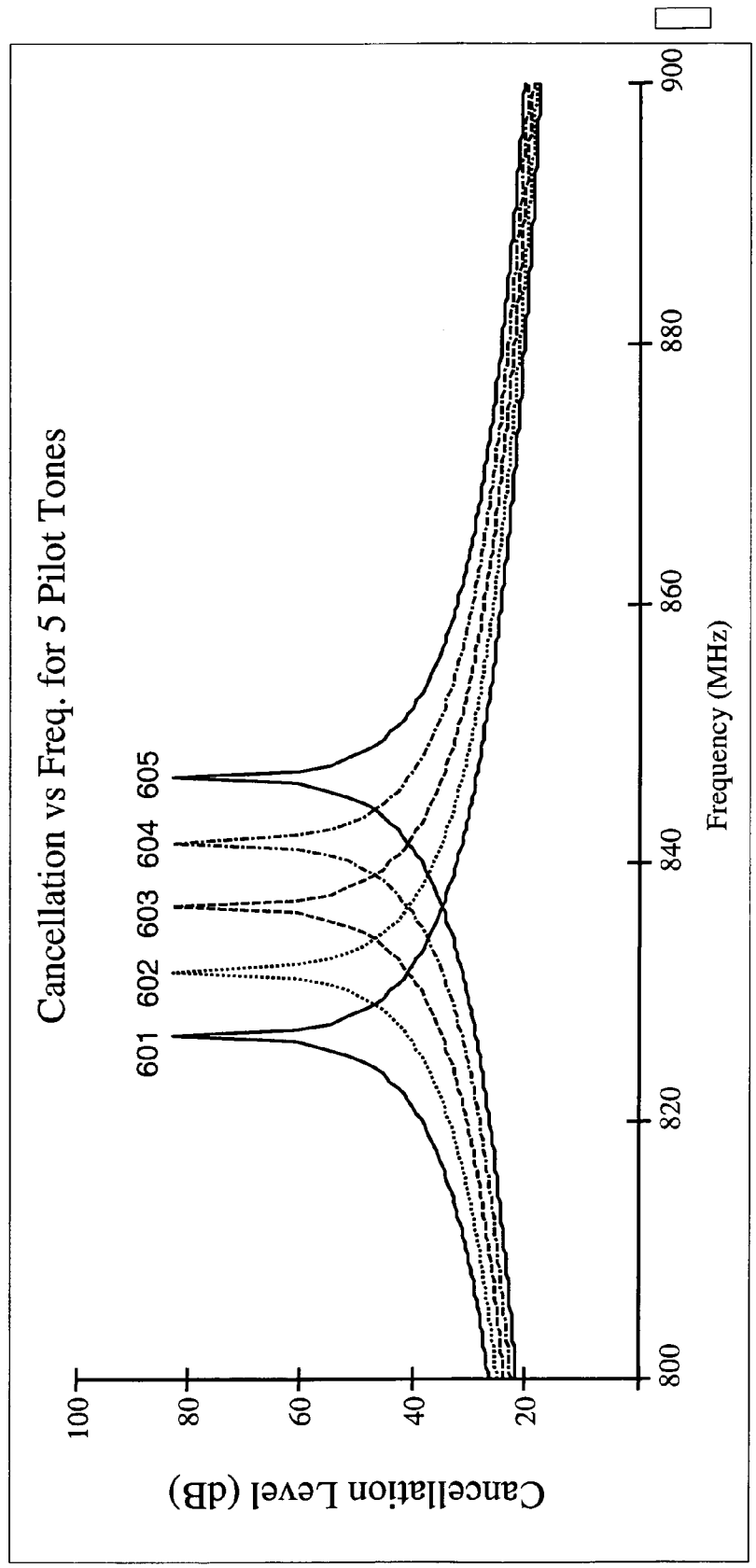
FIG. 6 shows a graph depicting examples of noise cancellation using the present invention.

Referring to FIG. 6, simulation performance results of the system level design are shown which indicate the high degree of cancellation achieved for five sample frequencies 601–605. By varying the input pilot tone, the centre frequency of the cancellation notch may be varied across the frequency spectrum to track the frequency at which cancellation is to be maximised.

Any range or device value given herein may be extended or altered without losing the effect sought, as will be apparent to the skilled person for an understanding of the teachings herein.

The invention claimed is:

1. A method of performing noise cancellation comprising the steps of:

receiving a signal having a frequency band;

generating a cancellation signal responsive to the signal for at least one predetermined frequency sub-band of the frequency band;

in which the signal is a transmit signal for a transceiver and the predetermined frequency sub-band corresponds to a receive frequency of the transceiver, and combining the cancellation signal with a time-delayed copy of the signal whereby to provide an output signal having a reduced amplitude region corresponding to the predetermined frequency sub-band.

2. A method according to claim 1 in which the step of generating a cancellation signal is performed for only one predetermined frequency sub-band of the frequency band.

3. A method according to claim 1 in which the step of generating a cancellation signal is performed for more than one predetermined frequency sub-band of the frequency band.

4. A method according to claim 3 in which the step of generating a cancellation signal is performed for two predetermined frequency sub-bands of the frequency band whereby to define a passband associated with the signal.

5. A method according to claim 1 additionally comprising the step of:
receiving a pilot tone;
determining the predetermined frequency sub-band responsive to the pilot tone.

6. A method according to claim 5 in which the pilot tone is swept through a pre-determined frequency band whereby to broaden the effective frequency sub-band.

7. A method according to claim 5 in which the frequency band corresponds to an active receive channel frequency.

8. A method according to claim 5 in which the predetermined frequency sub-band is determined by a local oscillator synchronised with the receive frequency.

9. A method according to claim 1 in which the predetermined frequency band varies dynamically.

10. A method according to claim 1 in which the predetermined frequency sub-band is determined by a local oscillator synchronised with the receive frequency.

11. A method according to claim 10 in which the transceiver is one of a wireless base station arrangement and a wireless communications terminal device.

12. A method according to claim 1 in which the transceiver is a radio frequency transceiver.

13. A method according to claim 1 in which the signal is a signal received by a transceiver and the predetermined frequency sub-band corresponds to a frequency of a received interference signal.

14. A method according to claim 13 in which the transceiver is a radio frequency receiver.

15. A method according to claim 1 in which the signal is provided by amplification of a second signal, and in which the step of generating a cancellation signal is performed without reference to the second signal.

16. A method according to claim 1 wherein the signal is an amplified signal and the steps of generating a cancellation signal and combining the cancellation signal with a time-delayed copy of the signal are performed on the amplified signal to provide a noise cancelled amplified signal for transmission.

17. A method of providing a data transmission service comprising a data signal, the method comprising the step of:
applying the method of claim 1 to the data signal.

18. A noise cancellation circuit comprising:
a first circuit arranged for receiving a signal having a frequency band;
a second circuit, coupled to the first, and arranged for generating a cancellation signal responsive to the signal for at least one predetermined frequency sub-band of the frequency band;
in which the signal is a transmit signal for a transceiver and the predetermined frequency sub-band corresponds to a receive frequency of the transceiver, and
a third circuit, coupled to the second, and arranged for combining the cancellation signal with a time-delayed copy of the signal whereby to provide an output signal having a reduced amplitude region corresponding to the predetermined frequency sub-band.

19. A noise cancellation circuit according to claim 18 additionally comprising:
a fourth circuit arranged for receiving a pilot tone and coupled to the second circuit whereby to determine the predetermined frequency band responsive to the pilot tone.

20. A transceiver comprising a noise cancellation circuit according to claim 18.

21. A communications system comprising a noise cancellation circuit according to claim 18.

22. A program for a computer on a machine readable medium comprising code portions arranged to:
control receipt of a signal having a frequency band;
control generation of a cancellation signal responsive to the signal for at least one predetermined frequency sub-band of the frequency band;
in which the signal is a transmit signal for a transceiver and the predetermined frequency sub-band corresponds to a receive frequency of the transceiver, and
control combination of the cancellation signal with a time-delayed copy of the signal whereby to provide an output signal having a reduced amplitude region corresponding to the predetermined frequency sub-band.

23. A method of performing noise cancellation at a transceiver having a transmit path and a receive path comprising the steps of:
sampling a signal in the transmit path of the transceiver, the signal having a frequency band;
generating a cancellation signal responsive to the signal for at least one predetermined frequency sub-band of the frequency band, the predetermined frequency sub-band corresponding to a receive frequency used in the transmit path of the transceiver at which it is desired to minimize noise;
combining the cancellation signal with a time-delayed copy of the signal whereby to provide an output signal for transmission having a reduced amplitude region corresponding to the predetermined frequency sub-band.

* * * * *